Sept. 1, 1964          B. H. BEAM          3,147,390

THERMO-ELECTROSTATIC GENERATOR

Filed Nov. 25, 1960          3 Sheets-Sheet 1

INVENTOR.
Benjamin H. Beam
BY
Buckhorn, Cheatham & Blore
ATTORNEYS

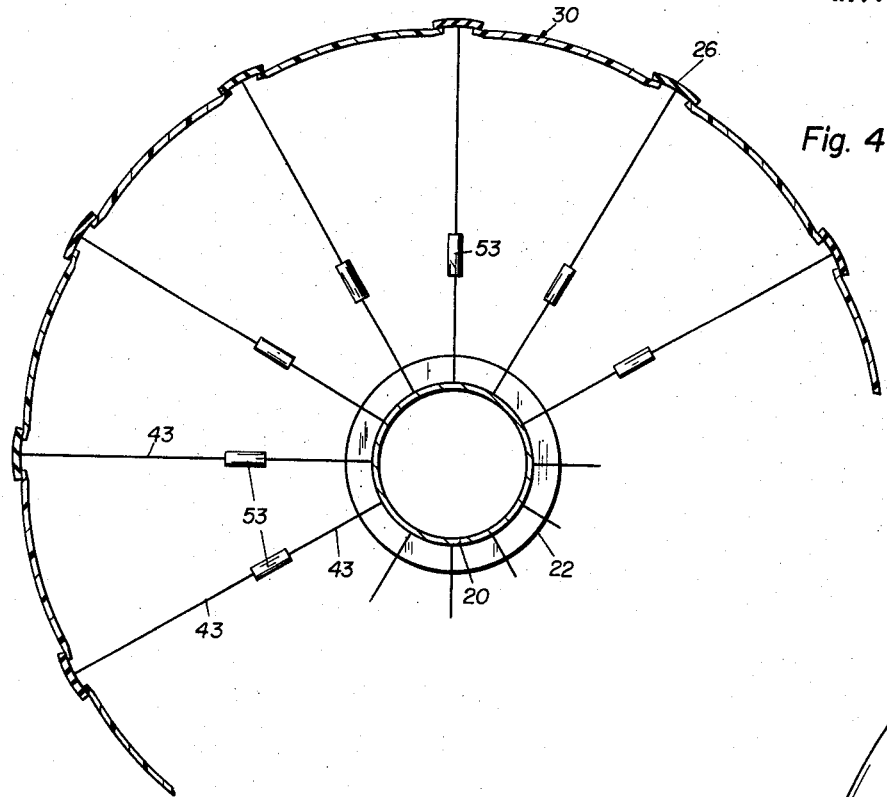
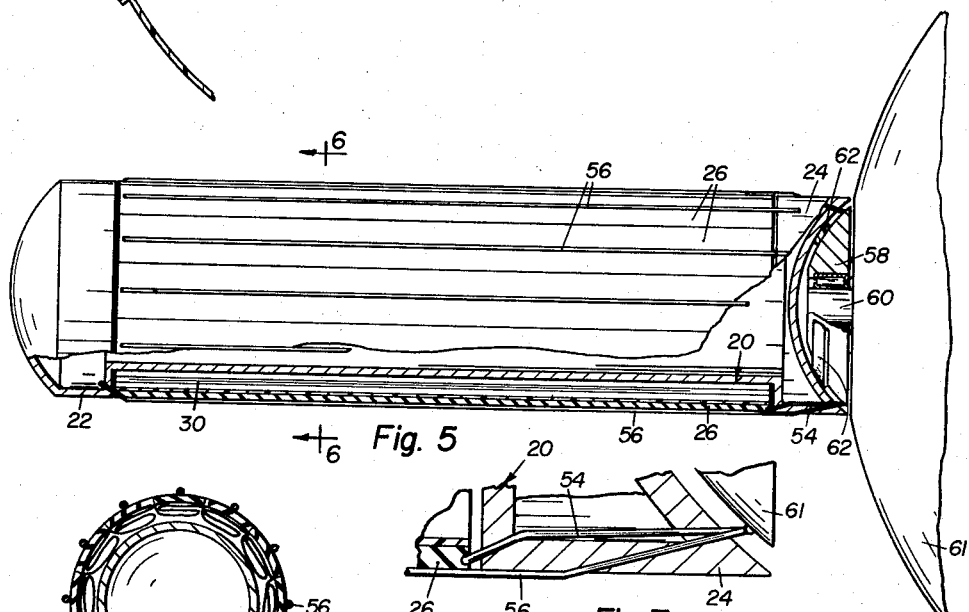
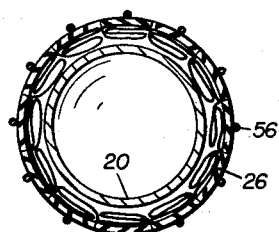
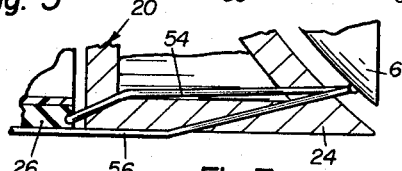

Sept. 1, 1964

B. H. BEAM 3,147,390

THERMO-ELECTROSTATIC GENERATOR

Filed Nov. 25, 1960

*INVENTOR.*
Benjamin H. Beam
BY
Buckhorn, Cheatham & Blore
*ATTORNEYS*

United States Patent Office 3,147,390
Patented Sept. 1, 1964

3,147,390
THERMO-ELECTROSTATIC GENERATOR
Benjamin H. Beam, 189 E. 13th St., Eugene, Oreg.
Filed Nov. 25, 1960, Ser. No. 71,684
12 Claims. (Cl. 310—4)
(Granted under Title 35, U.S. Code (1952), sec. 266)

This invention described herein may be manufactured and used by or for the Government of the United States of America for governmental purposes without the payment of any royalties thereon or therefor.

This invention relates to a thermo-electrostatic generator and more particularly to a light weight power supply for space vehicles employing a thermo-electrostatic cycle for converting radiant thermal energy from the sun into electrical energy.

A unit thermo-electrostatic generator in accordance with the present invention includes a thin film of dielectric material having thin coatings of electrically conducting material on opposite surfaces so that such coatings are insulated from each other by the film of dielectric material to provide an electric capacitor. The dielectric material changes its dielectric constant with changes in temperature so that the capacitance of the capacitor referred to above also changes with temperature. By charging such a capacitor through suitable conductors connected to the coatings to provide a voltage across the capacitor while the dielectric material thereof is at one temperature and then changing the temperature of the dielectric to decrease the capacitance of the capacitor, the voltage across the capacitor is increased so that a greater increment of electric energy can be withdrawn from the capacitor than was originally delivered into the capacitor during charging. This involves a conversion of heat energy into electrical energy.

By connecting a plurality of the capacitors described above into a suitable circuit including a plurality of rectifiers and then changing the temperatures of selected capacitors in opposite directions by heating certain of the capacitors while cooling others and vice-versa, a self starting and regenerative circuit can be provided from which direct current power can be continuously withdrawn.

The heating and cooling of capacitors of substantial size can be effected by exposing large areas of the coated dielectric film described above to the sun and thereafter shielding such areas from the sun and then again exposing them to the sun, etc. This can be accomplished by mounting such large areas of coated dielectric film on the periphery of a rotating body having its axis of rotation normal to the direction of radiant energy from the sun. Very substantial amounts of electric power can thus be generated in space without employing mechanical power after the rotating body has once been given an initial spin. Thus the generator of the present invention is capable of generating in space more electrical power per pound of weight than other known generators since it can be fabricated entirely of light weight material. Also it can be packaged in a small volume and thereafter expanded to a large volume for use. In operation it has no parts which must be moved relative to other parts, thus eliminating friction and wear. It can stand substantial physical damage such as abrasion and punctures and still operate satisfactorily. It is self starting, requires no fuel for operation and generates electric power at useable high voltages.

It is therefore an object of the present invention to provide an improved generator of electric power which receives radiant energy from the sun and converts it into electrical energy.

Another object of the invention is to provide a light weight electrical generator which can be packaged in a small volume and expanded after transportation into space, which generator will convert radiant energy into electrical energy without the employment of mechanical energy after being transported into space and set into rotation.

Another object of the invention is to provide a light weight electrical generator which operates on a thermo-electrostatic cycle to convert radiant energy into electrical energy and which requires no relatively moving parts during operation.

A further object of the invention is to provide a thermo-electrostatic generator in which a plurality of capacitors formed of thin films of dielectric material of large area and coated on opposite sides with conducting material are employed to produce electrical power from radiant energy when alternately exposed to and shielded from the source of such radiant energy.

A further object is to provide a thermo-electrostatic generator which is regenerative and self starting so far as electrical generation is concerned and requires no mechanical energy for operation after such generator has been transported into space and set into rotation.

Other objects and advantages of the invention will appear in the following description of preferred embodiments of the invention shown in the attached drawing of which:

FIG. 4 is a partial cross-sectional view taken on the line 4—4 of FIG. 1;

FIG. 5 is a view similar to FIG. 1, showing the generator in its packaged or non operative condition and attached to a propelling device, for example, the final stage of a space rocket;

FIG. 6 is a cross section through the generator in its non operative condition and taken on the line 6—6 of FIG. 5;

FIG. 7 is a fragmentary sectional view on an enlarged scale showing a detail of the structure for releasing the generator so that it can move to its operative condition;

Figure 1:
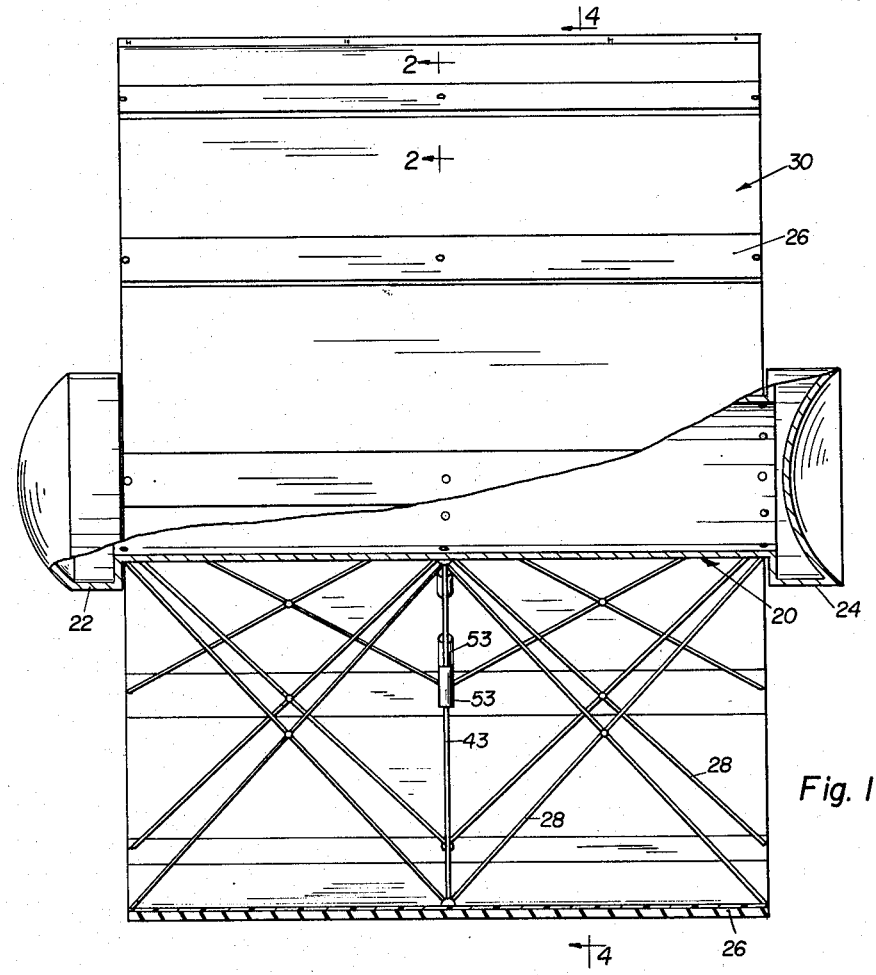
FIG. 1 is a side elevation of a thermo-electrostatic generator in accordance with the present invention in expanded or operative condition with parts broken away to show internal structure.

Referring more particularly to the drawing, a generator in accordance with the invention is shown in its expanded or operative condition in FIGS. 1 to 4 of the drawing. It includes a central tubular and cylindrical body portion 20 preferably of light weight plastic or metal which may contain, is desired, any suitable instruments or other space cargo which can be rotated with the generator. The body portion preferably has portions 22 and 24 at opposite ends which are of larger diameter than the central portion to provide space between such end portions for the other elements of the generator when in folder or collapsed position as described below.

The generator also includes a plurality of axially extending stiffening elements 26 of light weight material such as a suitable plastic. Such stiffening elements are spaced radially from the body portion 20 and are secured thereto by a plurality of tension elements 28 which may be flexible wires extending both radially and axially from the body portion so as to be angularly positioned with respect to the stiffening elements 26 and body portion 20. The stiffening elements 26 are equally circumferentially spaced around the body portion and are held in spaced position relative to such body portion by centrifugal force, since the generator is assumed to be rotating about the central axis of the body portion 20.

Films 30 of suitable plastic having coatings 32 and 34 (FIGS. 2 and 3) of conducting metal on opposite sides extend circumferentially of the generator between adjacent stiffening elements and have their edges secured thereto, for example, by a suitable adhesive. The metallic coating 34 on the outer surface of the film 30 preferably has a thin coating 35 of a black material such as lampblack in a suitable medium to increase the heat absorption by the coated film 30 when exposed to the sun and also to increase the heat radiation from such film when shaded from the sun. The inner metallic coatings are preferably bright so as to reduce heat radiation into the interior of the generator.

Figure 2:
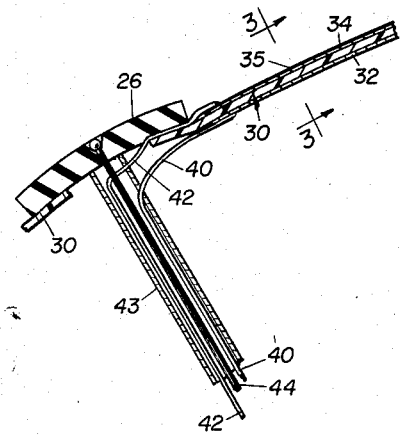
FIG. 2 is a fragmentary cross sectional view on an enlarged scale showing a stiffening member and a coated dielectric film in section and showing electrical connections to the coatings on such film, such view being taken on the line 2—2 of FIG. 1.
Figure 3:
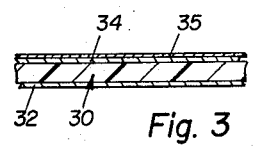
FIG. 3 is a fragmentary cross-sectional view of the coated film on a further enlarged scale taken on the line 3—3 of FIG. 2.

As shown in FIG. 2, electrical connections can be made to the two metallic coatings 32 and 34 of each film 30 by conductors 40 and 42, respectively. The conductors 40 and 42 extend radially inwardly in casings 43 also containing a support wire 44. The conductors 40 and 42 are connected to rectifiers 46 and 48 (FIG. 8), respectively, with associated spark gaps 50 and 52, respectively, the rectifiers and associated spark gaps being contained in housings 53 shown in FIGS. 1 and 4.

As shown in FIGS. 5 and 6, the expanded structure of FIGS. 1 and 4 may be packaged in folded or compact condition. The stiffening elements 26 fit within the space provided between the enlarged end portions 22 and 24 and are held in position by a plurality of short wires 54 and long wires 56 which extend through the end portion 24. There is a wire 54 for each stiffening element 26 and the end of each such wire enters a hole in the end of a stiffening element 26 which is nearest the end portion 24. Similarly there is a long wire 56 for each stiffening element 26. Such long wire extends exteriorly of the stiffening elements then through a hole in the end of a stiffening element nearest the end portion 22 and then into a hole in such end portion. It will be apparent that such wires 54 and 56 hold the stiffening elements in position on the body portion 20. The stiffening elements are spaced radially from the body portion 20 and are of sufficient width to provide a closed annular chamber around the body portion in which the coated films 30 as well as the various wires 28 and conductors 40 and 42 and associated housings are packed.

The end portion 24 of the body portion 20 is shown in FIG. 7 as being attached to a rotor 58 mounted for rotation on a stub shaft 60 carried by the forward portion 61 of the final stage of a rocket or other space vehicle. The rotor 58 can be given an initial spin to spin the packaged generator about its axis by any suitable means such as a motor (not shown) before the space vehicle leaves the earth, and the generator will continue to spin indefinitely after being separated from the space vehicle outside the atmosphere. The generator can be separated from the rotor at the desired time by any suitable means such as the firing of a small explosive charge 62, shown in FIG. 5 as a circular band positioned between the rotor 58 and the packaged generator. The wires 54 and 56 which retain the spacing elements in packaged or compact position on the central body portion 20 are attached to the rotor 58 and upon firing the explosive charge 62, the packaged generator is propelled away from the space vehicle to withdraw the wires 54 and 56. The generator expands due to centrifugal force to its operating condition of FIGS. 1 and 4.

Figure 8:
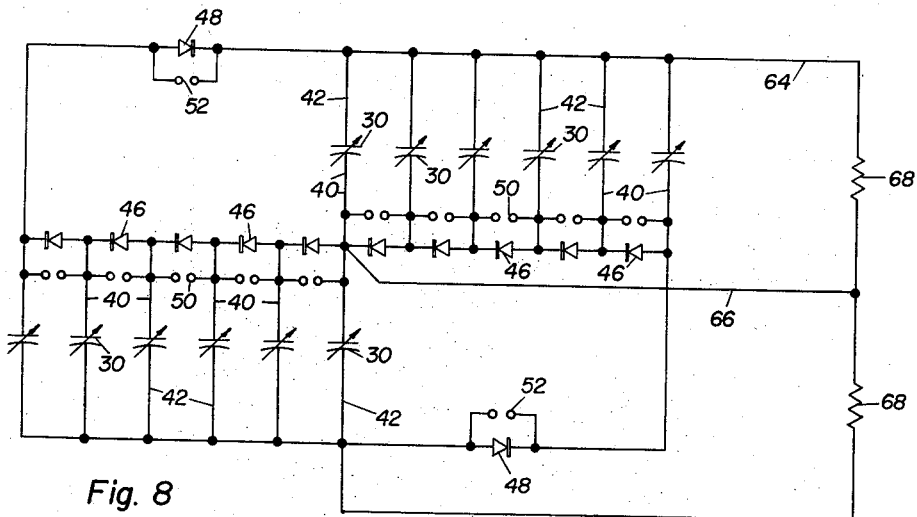
FIG. 8 is a circuit illustrating how the capacitors provided by the device of FIGS. 1 to 7 are connected to provide a useful power output.

A circuit diagram is shown in FIG. 8 and shows the capacitors 30 formed by the coated films arranged in two banks. The capacitors of each bank each have one terminal connected to a conductor 64. The rectifiers 46 and spark gaps 50 are all connected in series, there being a rectifier 46 and a spark gap 50 connected between pairs of conductors 40 connected to the capacitors 30. Alternate capacitors 30 in each bank of capacitors shown in FIG. 8 represent coated dielectric films positioned on opposite sides of the generator so that alternate capacitors in a bank are being heated while the capacitors between such alternate capacitors are cooling. As the generator rotates such capacitors are all successively heated and cooled.

The dielectric film of the specific example of this application increases its dielectric constant as the temperature increases within the operating range of temperatures contemplated so that the capacitance of each of the capacitors increases with increase of temperature and vice versa. Thus for a given charge on or quantity of electricity in a given capacitor the voltage across such capacitor decreases with increase of temperature and increases with decrease of temperature of the dielectric film.

If the FIG. 8 the dielectric film of every other capacitor 30 in each bank is being cooled as above described, the voltage across such capacitors will tend to increase across such capacitors. If at the same time the dielectric films of the other capacitors are being heated, the voltage across such other capacitors will tend to decrease. Current can only flow in one direction from one capacitor 30 to another capacitor because of the rectifiers 46. Such current will flow from the capacitors being cooled to the capacitors being heated in the direction permitted by the rectifiers as the alternate capacitors are alternately heated and cooled. The charges on successive capacitors in each bank will progressively increase so that the voltages on such successive capacitors will increase. Current is delivered from one bank of capacitors to the other by the rectifiers 48 so that the device is regenerative and the charges on the capacitors and the voltages across such capacitors will build up to high values unless electrical power is taken from the device or such build up is otherwise limited. Any small charge on any capacitor will start the build up of charges and voltages.

Electrical power can be withdrawn from the generator through the conductors 64 and 66 and delivered to the loads shown as resistors 68, although it will be understood that the power output may be employed for any purpose. Also the spark gaps 50 and 52 are preferably provided to limit the voltage produced in case the loads 68 become disconnected or take insufficient power to limit the voltages across the various capacitors or banks of capacitors to safe values.

As a specific example the dielectric film may be polyethylene terephthalate, since such material has a high dielectric constant, high electrical resistivity and high dielectric strength and also high mechanical strength. Also it will withstand the temperatures encountered in space and the rapid change of temperatures required. The film may be coated with coating of aluminum applied by vacuum deposition. Such coatings may be quite thin, for example a few hundred angstrom units thick. Polyethylene terephthalate thus provides a flexible film of plastic material which has the mechanical strength to support the thin metallic coatings even when employed in the form of a thin film having the thickness given below. Any fault or puncture of the coated film will result in a fault current which will vaporize the thin coatings so that the coated film is electrically self healing.

Figure 9:
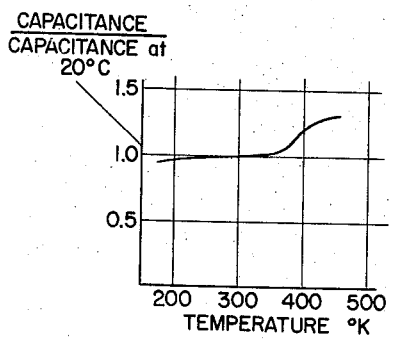
FIG. 9 is a graph showing the change in capacitance with temperature of a capacitor employing one type of coated dielectric film.
Figure 10:
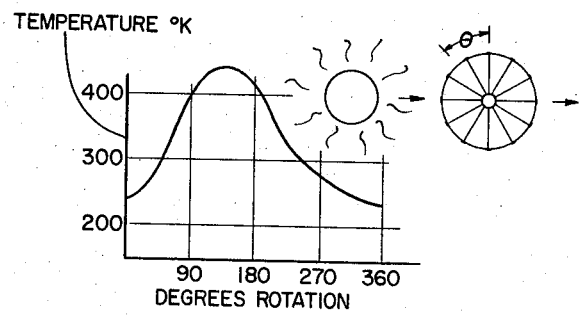
FIG. 10 is a graph showing the change in temperature in degrees K. of the coated films as the generator of the present invention is rotated in space.

The graph of FIG. 10 shows the approximate temperatures reached by a film 0.00025 inch in thickness in each cycle, such temperatures being resulting from rotation of the generator at a rate of 2½ revolutions per minute. Thus the temperature of the dielectric film will vary between approximately 250 and 450° K. for radiation intensities equal to that of the sun on the earth, and where the thermal absorbtivity of the surface is 1.75 times as great as the emissivity. The graph of FIG. 9 shows the variation in capacitance of the capacitors formed by the coated polyethylene terephthalate in terms of the capacitance at any temperature divided by the capacitance at 20° C. With the range of 250 to 450° K. the capacitance varies from approximately 1.0 to 1.25 times the capacitance at 20° C. With such temperature variation twelve sections of the film are sufficient to provide a regenerative system capable of supplying external power although a greater number and in some cases a lesser number of sections can be employed. The amount of output power developed will depend upon the size of the various sections of the generator and their number.

In operation the thermo-electrostatic generator of FIGS. 1 to 8 can be packaged as shown in FIGS. 5 to 7 and mounted on a rotor 58 on the final stage 62 of a space rocket. When desired trajectory is achieved, the packaged generator can be separated from the rocket stage by the explosive charge 62. This will withdraw the holding wires 54 and 56 to release the stiffening elements 26. If the packaged generator has been given an initial spin about the axis of rotation of the rotor 58, the generator will expand to the condition shown in FIGS. 1 to 4 and its speed of rotation will slow to a calculated predetermined speed such as 2.5 revolutions per minute. The expanded generator is preferably oriented in space so that the films 30 are alternately exposed and shaded from the source of radiation such as the sun. Thus the axis of rotation of the generator is preferably positioned substantially normal of the plane of the ecliptic if the sun is the source of radiation and the generator is in orbit about the earth, so that the operation of the generator is not effected by the progression of the earth about the sun.

Since the capacitors provided by the coated films are connected in banks, as shown in FIG. 8, and are also connected so that alternate capacitors in a bank are positioned on approximately opposite sides of the generator, every other capacitor is being cooled while the remaining capacitors are being heated. The heated capacitors have greater capacitance than the cooled capacitors so that current flows from the cooled capacitors to the heated capacitors in the direction set by the rectifiers 46. The action is analogous to a bank of pumps in series. The output of one bank of capacitors is fed to the input of the other bank by the rectifiers 48 so that the device is regenerative. It will be apparent that each capacitor in a bank alternately charges the succeeding capacitor in the bank and receives a charge from the preceding capacitor in the bank and that each bank charges the first capacitor of the other bank. Output power is delivered to the loads 68 through the conductors 64 and 66 and the spark gaps 50 and 52 limit the voltages which can be built up in the generator.

Figure 11:
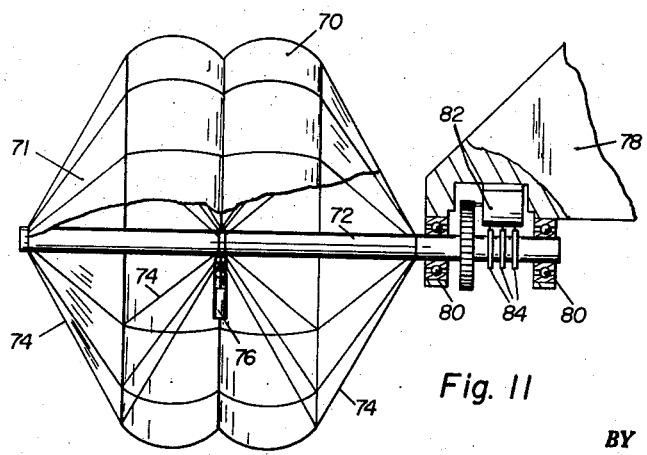
FIG. 11 is a view similar to FIG. 1 on a reduced scale showing a modified thermo-electrostatic generator.

A modified generator is shown in FIG. 11 which has a plurality of sections 70 of metallic coated dielectric film secured to a central body member 72 by a plurality of tension wires 74, some of which may serve as the conductors for connecting the capacitors thus formed to rectifiers and other circuit elements contained in housings 76. The sections 70 of coated film in conjunction with end sections 71 form a continuous covering for the generator to provide an envelope which can be expanded by inflation when placed in operation and maintained in expanded condition by gas or vapor pressure. No stiffening elements, such as the elements 26, are employed thus reducing the weight of the generator.

The body member 72 is shown as being mounted for rotation on a support 78 by bearings 80 and as being driven by an electric motor 82 receiving power from the thermoelectrostatic generator through slip rings 84. The motor 82 need only have sufficient power to overcome the frictional load of the bearings 80 and slip rings 84. The frictional load of the bearings 80 can be made very small in the absence of gravity and also the load added by the slip rings can be made very small so that useful output power over that required by the motor can be obtained. It will be apparent that a similar mounting and driving arrangement may be employed with the generator of FIGS. 1 to 7 and that the operation of the generator of FIG. 11 is substantially the same as that of FIGS. 1 to 7. For example, the generator of FIG. 11 can be packaged in collapsed condition by wrapping the films 70 and wires 74 around the body portion and holding them in position by releasable holding wires such as the wires 54 and 56 of FIGS. 5 to 7. The wires can be released by any suitable device, such as the explosive device of the modification of FIGS. 5 to 7, and at the same time an inflating gas or vapor forming material can be released in the interior of the inflatable envelope provided by the generator.

I claim:

1. A thermo-electrostatic generator which comprises, a dielectric film of flexible plastic material which changes its dielectric constant with changes in temperature, said film having a coating of electrically conducting material on its opposite surfaces insulated from each other and supported by said film to provide a capacitor which changes its capacitance with said changes in temperature, one of said coated surfaces being positioned for exposure to varying amounts of radiant energy to produce alternately heating and cooling of said film, means to charge said capacitor while said film is at a first temperature and to withdraw electric energy from said capacitor while said film is at a second temperature at which the capacitance of said capacitor is lower and the voltage across said capacitor is higher than at said first temperature.

2. A thermo-electrostatic generator which comprises, a dielectric film of flexible plastic material which changes its dielectric constant with changes in temperature, said film having a coating of electrically conducting material on its opposite surfaces insulated from each other and supported by said film to provide a capacitor which changes its capacitance with said changes in temperature, said film being supported by its edges so as to be positioned for exposure to varying amounts of radiant energy producing alternate heating and cooling of said film, means to change such capacitor while said film is at a first temperature and to withdraw electric energy from said capacitor while said film is at a second temperature at which the capacitance of said capacitor is lower and the voltage across said capacitor is higher than at said first temperature.

3. A thermo-electrostatic generator which comprises, a plurality of generator units each including a dielectric film of flexible plastic material which changes its dielectric constant with changes in temperature, said film having a coating of electrically conducting material on its opposite surfaces insulated from each other and supported by said film to provide a capacitor which changes its capacitance with said changes in temperature, one of said coated surfaces being positioned for exposure to varying amounts of radiant energy to produce alternate heating and cooling of said film, means to charge said capacitor while said film is at a first temperature, and means to withdraw electric energy from said capacitor while said film is at a second temperature at which the capacitance of said capacitor is lower and the voltage across said capacitor is higher than at said first temperature, said means to charge said capacitor including another said generator unit having its film at approximately said second temperature and said means to withdraw energy from said capacitor including a third said generator unit having the temperature of its film at approximately said first temperature.

4. A thermo-electrostatic generator which comprises, a plurality of generator units each including a dielectric film of flexible plastic material which changes its dielectric constant with changes in temperature, said film having a coating of electrically conducting material on its opposite surfaces insulated from each other and supported by said film to provide a capacitor which changes its capacitance with said changes in temperature, said film being supported by its edges so as to be positioned for exposure to varying amounts of radiant energy producing alternate heating and cooling of said film, means including a second generator unit and a rectifier for charging said capacitor which said dielectric is at a first temperature and means including a third generator unit and a rectifier for withdrawing electric energy from said capacitor while said dielectric is at a second temperature at which the capacitance of said capacitor is lower and the voltage across said capacitor is higher than at said first temperature, said second generator unit having its film at said second temperature during said charging and said third generator unit having its film at said first temperature during said withdrawing of electrical energy.

5. A thermo-electrostatic generator, which comprises, a plurality of generator units mounted upon and distributed around the periphery of said generator, each of said units including an area of dielectric film of flexible plastic material which changes its dielectric constant with change in temperature, said film having coatings of conducting material on its opposite surfaces insulated from each other and supported by said film to provide a capacitor which changes its capacitance with said change in temperature, said coated films being exposed to the space surrounding said generator, a circuit including unidirectional electrical conducting devices connecting said units in series to cause electrical energy to flow progressively through such devices from capacitors at a temperature producing a lowered capacitance to capacitors at a temperature producing an increased capacitance, adjacent units in said series being positioned on opposite sides of said generator to be alternately heated and cooled by rotation of said generator while exposed to radiation from a source of radiation, and means to withdraw electrical energy from said circuit.

6. A thermo-electrostatic generator, which comprises, a plurality of generator units mounted upon and distributed around the periphery of said generator, each of said units including an area of dielectric film of flexible plastic material which changes its dielectric constant with change in temperature, said film having coatings of conducting material on its opposite surfaces insulated from each other and supported by said film to provide a capacitor which changes its capacitance with said change in temperature, said coated films being exposed to the space surrounding said generator, a circuit including a rectifier connected to each of said capacitors, said rectifier being connected to another of said capacitors to provide a discharging circuit therefor and to provide for flow of electrical energy progressively through said rectifiers from capacitors at a temperature producing a lowered capacitance to capacitors at a temperature producing an increased capacitance, adjacent capacitors connected to said series of rectifiers being positioned on opposite sides of said generator to thereby be alternately heated and cooled by rotation of said generator while exposed to radiation from a source of radiant energy, and means to withdraw electrical energy from said circuit.

7. A thermo-electrostatic generator, which comprises, a plurality of generator units carried by and distributed around said generator, each of said units including an area of dielectric film of flexible plastic material which changes its dielectric constant with change in temperature, said film having coatings of conducting material on its opposite surfaces insulated from each other and supported by said film to provide a capacitor which changes its capacitance with said changes in temperature thereof caused by rotation of said generator while exposed to radiation from a source of radiant energy, a circuit including a plurality of rectifiers connected in series for flow of electrical current in one direction through said rectifiers, said capacitors on each side of said generator being connected to said rectifiers to discharge through alternate rectifiers of said series into capacitors on the other side of said generator as said capacitors are alternately heated and cooled, rectifier means to feed back current from the discharge end of said circuit to the other end thereof and means to withdraw electrical energy from said circuit.

8. A thermo-electrostatic generator rotatable about a central axis, which generator comprises, a plurality of generator units distributed around and radially spaced from said axis when in operating position, each of said units including an area of dielectric film of flexible plastic material which changes its dielectric constant with change in temperature, said film having coatings of conducting material on its opposite surfaces insulated from each other and supported by said film to provide a capacitor for each unit which changes its capacitance with said change in temperature as said capacitors of said units are alternately heated and cooled by rotation of said generator while exposed to radiation from a source of radiant energy, means utilizing said change in capacitance to generate electrical energy, means for holding said films in packaged position nearer said central axis than when in said operating position, and means for releasing said holding means and causing said units to assume said operating position.

9. A thermo-electrostatic generator, which comprises, a central body member, a plurality of generator units distributed around and radially spaced from said body member when in operating position, each of said units including an area of dielectric film of flexible plastic material which changes its dielectric constant with change in temperature, said film having coatings of conducting material on its opposite surfaces insulated from each other and supported by said film to provide a capacitor for each unit which changes its capacitance with said change in temperature as said capacitors of said units are alternately heated and cooled by rotation of said generator while exposed to radiation from a source of radiant energy, means utilizing said change in capacitance to generate electrical energy, a plurality of stiffening elements extending axially of said generator, said films being secured at their edges to said stiffening elements, said stiffening elements being secured to said body member by flexible tension members, means for holding said stiffening elements adjacent said body member to provide an annular chamber in which said films can be packaged and means for releasing said stiffening elements to enable said units to assume said operating position under the action of centrifugal force due to rotation of said generator.

10. A thermo-electrostatic generator rotatable about a central axis, which generator comprises, a plurality of generator units distributed around and radially spaced from said axis when in operating position, each of said units including an area of dielectric film of flexible plastic material which changes its dielectric constant with change in temperature, said film having coatings of conducting material on its opposite surfaces insulated from each other and supported by said film to provide a capacitor for each unit which changes its capacitance with said change in temperature as said capacitors of said units are alternately heated and cooled by rotation of said generator while exposed to radiation from a source of radiant energy, means utilizing said change in capacitance to generate electrical energy, said generator including said films of said units forming an inflatable envelope, which can be packed in collapsed condition and inflated to operating position.

11. A thermo-electrostatic generator which comprises, a film of polyethylene terephthalate, said film having a coating of electrically conducting material on its opposite surfaces insulated from each other and supported by said film to provide a capacitor which changes its capacitance with said changes in temperature, one of said coated surfaces being positioned for exposure to varying amounts of radiant energy to produce alternately heating and cooling of said film, means to charge said capacitor while said film is at a first temperature and to withdraw electric energy from said capacitor while said film is at a second temperature at which the capacitance of said capacitor is lower and the voltage across said capacitor is higher than at said first temperature.

12. A thermo-electrostatic generator which comprises, a film of polyethylene terephthalate, said film having a coating of electrically conducting material on its opposite surfaces insulated from each other and supported by said film to provide a capacitor which changes its capacitance with said changes in temperature, said film being supported by its edges so as to be positioned for exposure to varying amounts of radiant energy producing alternate heating and cooling of said film, means to charge such capacitor while said film is at a first temperature and to withdraw electric energy from said capacitor while said film is at a second temperature at which the capacitance of said capacitor is lower and the voltage across said capacitor is higher than at said first temperature.

References Cited in the file of this patent
UNITED STATES PATENTS

| | | |
|---|---|---|
| 1,992,908 | Cockcroft | Feb. 26, 1935 |
| 2,056,376 | Travis | Oct. 6, 1936 |
| 2,567,373 | Gialetto | Sept. 11, 1951 |
| 2,735,970 | Peck | Feb. 21, 1956 |
| 2,814,660 | Crownover | Nov. 26, 1957 |
| 2,856,575 | Charbonnier | Oct. 14, 1958 |
| 3,047,259 | Tatnall | July 31, 1962 |

OTHER REFERENCES

Publication: Aviation Week, Apr. 27, 1959, page 93.
Publication: Electronic Design, Sept. 30, 1959, pages 3, 4 and 5.
Publication: Aviation Week, Jan. 4, 1960, pages 18 and 19.